United States Patent Office 3,801,516
Patented Apr. 2, 1974

3,801,516
SUBSTANTIALLY NEUTRAL PLATINUM SERIES CATALYST
Bernard Juguin and Jean Francois Le Page, Rueil Malmaison, and Jean Miquel, Paris, France, assignors to Institut Francais du Petrole des Carburants et Lubrifiants
No Drawing. Filed May 17, 1971, Ser. No. 144,227
Claims priority, application France, May 27, 1970, 19,479
Int. Cl. B01j 11/08
U.S. Cl. 252—466 PT   7 Claims

ABSTRACT OF THE DISCLOSURE

The catalyst of this invention comprises alumina, a Group VIII metal and a Group VI metal; its specific surface is 20-150 m.$^2$/g. and its neutralization heat by ammonia adsorption is lower than 10 calories per gram at 320° and 300 mm. Hg. It may be used for dehydrogenating saturated hydrocarbons.

---

This invention relates to a catalyst which may be used, for example, for dehydrogenating saturated hydrocarbons to the corresponding unsaturated hydrocarbons with the same number of carbon atoms per molecule.

One main object of this invention is the use of this catalyst for dehydrogenating straight-chain paraffinic hydrocarbons with 3-40 carbon atoms: the products resulting from dehydrogenating straight-chain hydrocarbons are starting materials for manufacturing detergent compositions of the alkylaromatic sulfonate or sulfate type which are liable to biological degradation.

One other main object of this invention is the recovery of the dehydrogenation products and the conversion of the same to long chain alcohols by Oxo synthesis.

Catalysts containing alumina and metals of Groups VI and/or VIII of the periodic classification, for example alumina, platinum and tungsten or molybdenum, have been used in reforming reactions and generally in reactions wherein the starting charge is transformed to a lighter charge. These catalysts are well-adapted to cracking or reforming reactions; however the results are deceiving when they are used, for dehydrogenating saturated hydrocarbons, catalysts such as those described hereinbefore, which contain as carrier alumina conventionally used in reforming reactions, i.e. alumina of relatively high acidity and specific surface.

This invention relates to a catalyst which may be used, in particular, for dehydrogenating saturated hydrocarbons and which contains (a) alumina, (b) a Group VIII metal selected from the group consisting of platinum, iridium, palladium and ruthenium, and (c) a Group VI metal selected from the group consisting of tungsten and molybdenum (tungsten is preferred to molybdenum), said catalyst being distinguished from the known catalysts especially by a specific surface of about 50-75 m.$^2$/gram and a neutralization heat by ammonia adsorption lower than about 10 calories per gram of catalyst at 320° C. and 300 mm. Hg.

Thus this catalyst is substantially neutral, and the acidity of the catalyst may be determined by the known ammonia adsorption test such as described, for example, in Journal of Catalysis, 2, 211–222 (1963): the method consists of heating the catalyst up to 600° C. in vacuo (0.01 mm. Hg) till complete removal of gas (this removes water and undesirable impurities); then the catalyst is introduced into a calorimeter at 320° C., and ammonia is admitted therein up to a final pressure of 300 mm. Hg in the apparatus: the heat release is measured.

The catalyst must have a neutralization heat by ammonia adsorption lower than about 10 calories per gram of catalyst at 320° C. and 300 mm. Hg; the neutralization heat of the alumina carrier is substantially the same, i.e. lower than 10 calories per gram of catalyst. The catalyst has also a specific surface of about 20–150 m.$^2$/g., preferably 40–100 m.$^2$/g. and preferentially 50–75 m.$^2$/g. The pore volume of the catalyst may be, for example, from 0.4 to 0.8 cc. per gram with at least 75% of the pore volume corresponding to pores with an average diameter between 100 and 500 angstroms. The specific surface and the pore volume of the alumina carrier are themselves in the above ranges.

Amongst aluminas, preference will be given to gamma alumina balls, for example those of tetragonal alumina. Other alumina agglomerates may be used, for example extrudates or pellets provided they conform to the above conditions.

If the carrier has too high acidity, it may be reduced by adding, before or after introduction of the dehydrogenating elements, compounds with a basic reaction or able to decompose under the conditions of the reaction and yield basic compounds. Alkali or alkaline-earth metal oxides and hydroxides are examples of these compounds, and also carbonates and other salts of weak acids (acid dissociation constant preferably lower than $10^{-3}$) of the same metals, for example sodium or potassium hydroxide, sodium or potassium carbonate, calcium acetate, sodium nitrate or magnesium acetate. The basic compound is generally used in an amount lower than 2% or even lower than 1% by weight with respect to the catalyst carrier. The Group VIII metal content is for example 0.01 to 1%, preferably 0.1 to 0.5% by weight; that of the Group VI metal is for example 0.01 to 1%, preferably 0.1 to 0.5% by weight.

The dehydrogenating elements, i.e. the metals of the hereinbefore defined groups, may be incorporated separately or preferably simultaneously to the carrier by means of solutions of the same, for example aqueous solutions of platinum, iridium, ruthenium or palladium chloride, hexachloroplatinic or hexachloroiridic acid, hexachloroplatinates and noble metal hexachlorides, platinum or other noble metal diamminodinitrites, ammonium, sodium or potassium meta or para tungstate, and ammonium, sodium or potassium molybdate.

The dehydrogenating elements once incorporated in the support, the catalyst may be dried, roasted by heating in an oxygen containing gas at a temperature of, for example, 300-600° C., then reduced in a hydrogen stream at a temperature of, for example, 350-700° C. for 2-30 hours, at an hourly hydrogen feed rate of about 100-1,000 times the catalyst volume. This is preferably carried out in the dehydrogenation reactor. The roasting may be omitted and the reduction carried out directly.

The reduction temperature is of substantial importance: when platinum, iridium, palladium or ruthenium is associated with tungsten, the reduction temperature is preferably 500–550° C.; with platinum, iridium, palladium or ruthenium and molybdenum, the reduction temperature is preferably 550–600° C.

The best conditions of use of these catalysts are the following: a temperature between 300 and 600° C., preferably between 400 and 500° C., for example 440–480° C., an hourly feed rate of liquid saturated hydrocarbon by volume of from 0.1 to 30 times the catalyst volume, for example from 2 to 10, an absolute pressure of 0.1 to 20 bars, preferably 0.5 to 5 bars, for example 1–3 bars. The hydrogen partial pressure is of major importance for the catalyst stability: the molar ratio of hydrogen to the hydrocarbons at the reactor inlet may be 0.1–30, preferably 2–20 and more preferably 8–15.

Propane, n-butane, iso-butane, n-hexane, n-dodecane and n-hexadecane are examples of dehydrogenable hydrocarbons.

The following Examples 1, 2, 3 and 4 are given for illustrative purposes. Examples 1A, 1B, 1C, 3A, 3B and 3C are given by way of comparison.

EXAMPLE 1

A $C_{10}$–$C_{10}$ normal paraffin cut is contacted with a catalyst A containing platinum and tungsten admixed with gamma alumina balls in a steel dehydrogenation reactor of 2 cm. internal diameter and 40 cm. length. This catalyst was manufactured by impregnating tetragonal gamma alumina balls of 70 m.$^2$/g. specific surface and 0.59 cm.$^3$/g. pore volume, 75% of this pore volume consists of pores with an average diameter of 100–500 angstroms. The neutralization heat of this gamma-alumina as determined by ammonia adsorption, was 7 calories per gram.

100 grams of these alumina balls are impregnated with 58 cm.$^3$ of an aqueous solution containing 6.7 cm.$^3$ of hexachloroplatinic acid solution with a 3% by weight content of platinum and 51.3 cm.$^3$ of a solution containing 0.273 g. of ammonium metatungstate of 92.3% content by weight of $WO_3$. The contact is maintained for 3 hours; at that time the solution has been completely absorbed by the alumina balls. They are dried for 6 hours at 100° C., then roasted for 2 hours at 400° C. in an air stream and finally for 2 hours at 500° C. After cooling, the catalyst is transferred into the dehydrogenation reactor in which it is reduced for about 12 hours at 530° C. in a hydrogen stream of 50 liters per hour.

The so-obtained catalyst contains 0.2% by weight of platinum and 0.2% by weight of tungsten. Its specific surface is 69 m.$^2$ per gram and its pore volume 0.58 cm.$^3$ per gram. The neutralization heat by ammonia absorption is 7 calories per gram of catalyst. 75% of the pore volume consists of pores of an average diameter of 100–500 angstroms.

The $C_{10}$–$C_{14}$ cut is passed through the catalyst at an hourly rate of 4 liquid volumes per volume of catalyst, a temperature of 450–470° C., an absolute pressure of 1 bar and a molar ratio of hydrogen to $C_{10}$–$C_{14}$ cut of 12 at the reactor inlet. The liquid and gaseous products from the reactor are analyzed by bromine number, gas phase chromatography, mass spectrometry and nuclear magnetic resonance. The results are summarized in Table I.

TABLE I

| Age of the catalyst (hours) | Reaction temperature, ° C. | Composition of the liquid by weight | | | | | Percent of the feed cracked to $C_1$–$C_5$ hydrocarbons |
|---|---|---|---|---|---|---|---|
| | | N-Paraffins | n-Mono-olefins | Iso-olefins plus iso-paraffins | Diolefins | Aromatic hydrocarbons | |
| 4 | 470 | 76.4 | 20.8 | 0.5 | 0.3 | 2 | 0.2 |
| 50 | 470 | 79.4 | 19 | 0.3 | 0.2 | 1.1 | 0.15 |
| 200 | 470 | 82.5 | 16.5 | 0.2 | 0.1 | 0.7 | 0.15 |
| 250 | 460 | 85.9 | 13.5 | 0.1 | 0.1 | 0.4 | <0.1 |
| 300 | 460 | 85.9 | 13.5 | 0.1 | 0.1 | 0.4 | <0.1 |
| 400 | 460 | 89.4 | 10.3 | 0.1 | 0.1 | 0.1 | <0.1 |

EXAMPLES 1A, 1B, 1C

Three catalysts $A_1$, $A_2$ and $A_3$ containing 0.2% of platinum by weight of 0.2% of tungsten by weight are manufactured according to the technique of Example 1.

The carrier of catalyst $A_1$ is a transition alumina whose specific surface is 122 m.$^2$/g., pore volume 0.92 cm.$^3$/g. and neutralization heat by ammonia adsorption 13 calories per gram.

The carrier of catalyst $A_2$ is alpha alumina whose specific surface is 7.8 m.$^2$/g., porous volume 0.50 cm.$^3$/g. and neutralization heat by ammonia adsorption 4 calories per gram.

The carrier of catalyst $A_3$ is cubic gamma alumina whose specific surface is 272 m.$^2$/g., pore volume 0.58 cm.$^3$/g. and neutralization heat by ammonia adsorption 35 calories per gram, i.e. a conventional carrier of hydroforming catalyst.

The specific surface of catalyst $A_1$ is 120 m.$^2$/g., its pore volume 0.9 cm.$^3$/g. and its neutralization heat by ammonia adsorption 13 calories per gram.

The specific surface of catalyst $A_2$ is 8 m.$^2$/g., its pore volume 0.51 cm.$^3$/g. and its neutralization heat by ammonia adsorption 4 calories per gram.

The specific surface of catalyst $A_3$ is 270 m.$^2$/g., its pore volume 0.55 cm.$^3$/g. and its neutralization heat by ammonia adsorption 35 calories per gram.

The reaction conditions are those of Example 1; the results are summarized in Table II.

The reduction temperature was 530° C. for the three catalysts $A_1$, $A_2$ and $A_3$.

TABLE II

| Catalyst | Age of the catalyst (hours) | Reaction temperature, ° C. | Composition of the liquid by weight | | | | | Percent of the feed cracked to $C_1$–$C_5$ hydrocarbon |
|---|---|---|---|---|---|---|---|---|
| | | | n-Paraffins | n-Mono-olefins | Iso-olefins plus iso-paraffins | Diolefins | Aromatic hydrocarbons | |
| $A_1$ | 4 | 470 | 74.9 | 18.6 | 2.7 | 0.9 | 2.9 | 0.5 |
| | 50 | 470 | 78.4 | 16.4 | 2.3 | 0.7 | 2.2 | 0.4 |
| | 200 | 470 | 80.8 | 14.9 | 2 | 0.5 | 1.8 | 0.4 |
| | 250 | 460 | 85.7 | 11.8 | 1.2 | 0.3 | 1 | 0.25 |
| | 300 | 460 | 86.2 | 11.4 | 1.1 | 0.3 | 1 | 0.25 |
| | 400 | 450 | 90 | 8.1 | 0.8 | 0.3 | 0.8 | 0.15 |
| $A_2$ | 4 | 470 | 82.5 | 15.2 | 0.3 | 0.2 | 1.8 | 0.15 |
| | 50 | 470 | 84.5 | 14.4 | 0.2 | 0.1 | 0.8 | 0.10 |
| | 200 | 470 | 86.2 | 13.2 | 0.1 | 0.1 | 0.4 | 0.10 |
| | 250 | 460 | 89.6 | 10.4 | 0.1 | 0.1 | 0.2 | <0.10 |
| | 300 | 460 | 89.6 | 10.4 | 0.1 | 0.1 | 0.2 | <0.10 |
| | 400 | 450 | 92 | 7.7 | 0.1 | 0.1 | 0.1 | <0.10 |
| $A_3$ | 4 | 470 | 66.2 | 16.2 | 6.3 | 3.2 | 8.1 | 2.4 |
| | 50 | 470 | 69.2 | 15.4 | 5.7 | 2.8 | 6.9 | 2.1 |
| | 200 | 470 | 70.9 | 14.9 | 5.3 | 2.5 | 6.4 | 1.9 |
| | 250 | 460 | 76.1 | 12.8 | 4.2 | 1.8 | 5.1 | 1.3 |
| | 300 | 460 | 76.8 | 12.3 | 4.1 | 1.8 | 5 | 1.2 |
| | 400 | 450 | 82.2 | 9.8 | 3 | 1.2 | 3.8 | 0.9 |

EXAMPLE 2

Two catalysts B and C of the following composition have been manufactured according to the technique of Example 1:

B: 0.2% iridium+0.2% tungsten
C: 0.2% ruthenium+0.2% tungsten

The carrier was the same tetragonal gamma alumina as used in Example 1. Both of catalysts B and C have a specific surface of 69 m.$^2$/g., a pore volume of 0.58 cm.$^3$/g. and a neutralization heat by ammonia adsorption of 7 calories per gram.

The reaction conditions are as disclosed in Example 1. The results are given in Table III.

are manufactured according to Example 1. However the carrier of catalyst $D_1$ is a transition alumina whose specific surface is 122 m.$^2$/g., pore volume 0.92 cc. per gram and neutralization heat by ammonia absorption 13 calories per gram.

The carrier of catalyst $D_2$ is alpha alumina whose specific surface is 7.8 m.$^2$/g., pore volume 0.5 cc. per gram and neutralization heat by ammonia adsorption 4 calories per gram.

The carrier of catalyst $D_3$ is cubic gamma alumina whose specific surface is 272 m.$^2$/g., pore volume 0.58 cc. per gram and neutralization heat by ammonia adsorption 35 calories per gram.

TABLE III

| Catalyst | Age of the catalyst (hours) | Reaction temperature, °C. | Composition of the liquid by weight | | | | | Percent of the feed cracked to $C_1$-$C_5$ hydrocarbons |
|---|---|---|---|---|---|---|---|---|
| | | | n-Paraffins | n-Mono-olefins | Iso-olefins plus iso-paraffins | Diolefins | Aromatic hydrocarbons | |
| B | 4 | 470 | 74.5 | 22.6 | 0.5 | 0.4 | 2 | 0.2 |
| | 50 | 470 | 77.4 | 20.7 | 0.4 | 0.3 | 1.2 | 0.2 |
| | 200 | 470 | 80.5 | 18.3 | 0.2 | 0.2 | 0.8 | 0.15 |
| | 250 | 460 | 84.2 | 15.1 | 0.1 | 0.1 | 0.5 | 0.1 |
| | 300 | 460 | 84.3 | 15 | 0.1 | 0.1 | 0.5 | 0.1 |
| | 400 | 450 | 88.1 | 11.6 | 0.1 | 0.1 | 0.1 | <0.1 |
| C | 4 | 470 | 81.4 | 15.8 | 0.4 | 0.2 | 2.2 | 0.2 |
| | 50 | 470 | 83.1 | 14.8 | 0.3 | 0.1 | 1.7 | 0.15 |
| | 200 | 470 | 85.4 | 13 | 0.2 | 0.1 | 1.3 | 0.1 |
| | 250 | 460 | 87.7 | 11.3 | 0.1 | 0.1 | 0.8 | <0.1 |
| | 300 | 460 | 87.7 | 11.3 | 0.1 | 0.1 | 0.8 | <0.1 |
| | 400 | 450 | 90.5 | 9.1 | 0.1 | 0.1 | 0.2 | <0.1 |

EXAMPLE 3

Three catalysts D, E and F of the following composition have been manufactured from tetragonal gamma alumina according to the technique of Example 1:

D: 0.2% platinum+0.2% molybdenum
E: 0.2% iridium+0.2% molybdenum
F: 0.2% ruthenium+0.2% molybdenum The three catalysts have a specific surface of 69 m.$^2$/g., a pore volume of 0.58 cm.$^3$/g. and a neutralization heat by ammonia adsorption of 7 calories per gram of catalyst.

The molybdenum salt employed for manufacturing the catalyst was ammonium molybdate of 81.5% $MoO_3$ content. The reduction temperature was 575° C. for the three catalysts. The reaction conditions were those of Example 1. The results are given in Table IV.

EXAMPLES 3A, 3B, 3C

Three catalysts $D_1$, $D_2$ and $D_3$ containing 0.2% by weight of platinum and 0.2% by weight of molybdenum The carrier of catalyst $D_3$ is a conventional carrier of hydroforming catalyst.

Thus these carriers have the same characteristics as the carriers of Examples 1A, 1B and 1C.

The specific surface of the resulting catalyst $D_1$ is 120 m.$^2$/g., its pore volume 0.9 cc. per gram. The neutralization heat by ammonia adsorption is 13 calories per gram of catalyst.

The specific surface of the resulting catalyst $D_2$ is 8 m.$^2$/g., its pore volume 0.51 cc. per gram. The neutralization heat by ammonia adsorption is 4 calories per gram of catalyst.

The specific surface of the resulting catalyst $D_3$ is 270 m.$^2$/g., its pore volume 0.55 cc. per gram. The neutralization heat by ammonia adsorption is 35 calories per gram of catalyst.

The reaction conditions are those of Example 1. The results are summarized in Table V.

TABLE IV

| Catalyst | Age of the catalyst (hours) | Reaction temperature, °C. | Composition of the liquid by weight | | | | | Percent of the feed cracked to $C_1$-$C_5$ hydrocarbons |
|---|---|---|---|---|---|---|---|---|
| | | | n-Paraffins | n-Mono-olefins | Iso-olefins plus iso-paraffins | Diolefins | Aromatic hydrocarbons | |
| D | 4 | 470 | 82.5 | 14.7 | 0.4 | 0.3 | 2.1 | 0.2 |
| | 50 | 470 | 84.8 | 13.2 | 0.2 | 0.3 | 1.5 | 0.2 |
| | 200 | 470 | 87.7 | 11.1 | 0.2 | 0.1 | 0.9 | 0.15 |
| | 250 | 460 | 90.6 | 8.7 | 0.1 | 0.1 | 0.5 | 0.1 |
| | 300 | 460 | 90.6 | 8.7 | 0.1 | 0.1 | 0.5 | 0.1 |
| E | 4 | 470 | 80.2 | 16.8 | 0.4 | 0.4 | 2.2 | 0.2 |
| | 50 | 470 | 82.6 | 15.2 | 0.3 | 0.3 | 1.6 | 0.2 |
| | 200 | 470 | 85.5 | 13.1 | 0.2 | 0.2 | 1 | 0.15 |
| | 250 | 460 | 88.8 | 10.4 | 0.1 | 0.1 | 0.6 | 0.1 |
| | 300 | 460 | 88.8 | 10.4 | 0.1 | 0.1 | 0.6 | 0.1 |
| F | 4 | 470 | 86.2 | 11.1 | 0.3 | 0.4 | 2 | 0.2 |
| | 50 | 470 | 88 | 10.3 | 0.2 | 0.3 | 1.2 | 0.15 |
| | 200 | 470 | 89.9 | 9 | 0.1 | 0.2 | 0.8 | 0.15 |
| | 250 | 460 | 92.2 | 7 | 0.1 | 0.1 | 0.6 | <0.1 |

The reduction temperature was 575° C. for the three catalysts $D_1$, $D_2$ and $D_3$.

$F_1$: 0.05% of ruthenium and 0.05% of molybdenum
$F_2$: 1% of ruthenium and 1% of molybdenum

TABLE V

| Catalyst | Age of the catalyst (hours) | Reaction temperature, ° C. | Composition of the liquid by weight | | | | | Percent of the feed cracked to $C_1$-$C_5$ hydrocarbons |
|---|---|---|---|---|---|---|---|---|
| | | | n-Paraffins | n-Mono-olefins | Iso-olefins + iso-paraffins | Diole-fins | Aromatic hydrocarbons | |
| $D_1$ | 4 | 470 | 81.3 | 13 | 2.3 | 0.7 | 2.7 | 0.4 |
| | 50 | 470 | 83.6 | 11.8 | 1.9 | 0.6 | 2.1 | 0.3 |
| | 200 | 470 | 86.4 | 10 | 1.5 | 0.4 | 1.7 | 0.3 |
| | 250 | 460 | 89.8 | 7.9 | 0.9 | 0.3 | 1.1 | 0.2 |
| | 300 | 460 | 90.4 | 7.5 | 0.8 | 0.3 | 1 | 0.2 |
| $D_2$ | 4 | 470 | 88 | 10.1 | 0.2 | 0.2 | 1.5 | 0.10 |
| | 50 | 470 | 89.4 | 9.7 | 0.2 | 0.1 | 0.6 | 0.10 |
| | 200 | 470 | 90.1 | 9.3 | 0.1 | 0.1 | 0.4 | <0.10 |
| | 250 | 460 | 93.2 | 6.6 | 0.1 | | 0.1 | <0.10 |
| | 300 | 460 | 93.2 | 6.6 | 0.1 | | 0.1 | <0.10 |
| $D_3$ | 4 | 470 | 72.7 | 12.2 | 5.4 | 2.7 | 7 | 2.1 |
| | 50 | 470 | 74.8 | 11.8 | 5 | 2.3 | 6.1 | 1.9 |
| | 200 | 470 | 75.9 | 11.5 | 4.8 | 2 | 5.8 | 1.8 |
| | 250 | 460 | 80.4 | 9.7 | 3.8 | 1.6 | 4.5 | 1.1 |
| | 300 | 460 | 80.9 | 9.4 | 3.6 | 1.7 | 4.4 | 1 |

EXAMPLE 4

Example 1 repeated with the same tetragonal gamma alumina to manufacture 12 catalysts as follows:

$A_4$: 0.05% of platinum and 0.05% of tungsten
$A_5$: 1% of platinum and 1% of tungsten
$B_1$: 0.05% of iridium and 0.05% of tungsten
$B_2$: 1% of iridium and 1% of tungsten
$C_1$: 0.05% of ruthenium and 0.05% of tungsten
$C_2$: 1% of ruthenium and 1% of tungsten
$D_4$: 0.05% of platinum and 0.05% of molybdenum
$D_5$: 1% of platinum and 1% of molybdenum
$E_1$: 0.05% of iridium and 0.05% of molybdenum
$E_2$: 1% of iridium and 1% of molybdenum Catalysts $A_4$, $A_5$, $B_1$, $B_2$, $C_1$, $C_2$ have been reduced at 530° C. and catalysts $D_4$, $D_5$, $E_1$, $E_2$, $F_1$, $F_2$ at 575° C. They have substantially the same specific surface, pore volume and neutralization heat by ammonia adsorption as catalyst A of Example 1.

The reaction conditions are those of Example 1, and the results are given in Table VI.

A comparison of these results with those of Examples 1, 2 and 3 shows that the best contents of catalyst metals are between 0.1 and 0.5%; when the content of active elements is too high, the activity and selectivity are not improved substantially and the selectivity is decreased.

TABLE VI

| Catalyst | Age of the catalyst (hours) | Reaction temperature, ° C. | Composition of the liquid by weight | | | | | Percent of the feed cracked to $C_1$-$C_5$ hydrocarbons |
|---|---|---|---|---|---|---|---|---|
| | | | n-Paraffins | n-Mono-olefins | Iso-olefins plus iso-paraffins | Diole-fins | Aromatic hydrocarbons | |
| $A_4$ | 4 | 470 | 88.8 | 10.6 | 0.2 | 0.1 | 0.3 | <0.1 |
| | 50 | 470 | 91.6 | 8.1 | 0.1 | 0.1 | 0.1 | <0.1 |
| | 200 | 470 | 95.2 | 4.8 | 0 | 0 | 0 | <0.1 |
| $A_5$ | 4 | 470 | 73 | 21.4 | 0.8 | 0.6 | 4.2 | 0.5 |
| | 50 | 470 | 76.1 | 19.7 | 0.6 | 0.5 | 3.1 | 0.4 |
| | 200 | 470 | 80 | 16.9 | 0 | 0 | 0 | 0.2 |
| $B_1$ | 4 | 470 | 88.1 | 11.3 | 0.2 | 0.1 | 0.3 | <0.1 |
| | 50 | 470 | 91.2 | 8.5 | 0.1 | 0.1 | 0.1 | <0.1 |
| | 200 | 470 | 94.7 | 5.3 | 0 | 0 | 0 | <0.1 |
| $B_2$ | 4 | 470 | 71.4 | 23 | 0.8 | 0.7 | 4.1 | 0.5 |
| | 50 | 470 | 74.6 | 21.2 | 0.6 | 0.6 | 3 | 0.4 |
| | 200 | 470 | 78.1 | 18.9 | 0.5 | 0.5 | 2.1 | 0.3 |
| $C_1$ | 4 | 470 | 91.4 | 8.1 | 0.2 | 0.1 | 0.2 | <0.1 |
| | 50 | 470 | 93.6 | 6.2 | 0.1 | 0 | 0.1 | <0.1 |
| | 200 | 470 | 96.1 | 3.9 | 0 | 0 | 0 | <0.1 |
| $C_2$ | 4 | 470 | 77.8 | 16.4 | 0.7 | 0.6 | 4.5 | 0.5 |
| | 50 | 470 | 80.1 | 15.5 | 0.5 | 0.5 | 3.4 | 0.4 |
| | 200 | 470 | 83.2 | 13.5 | 0.4 | 0.3 | 2.6 | 0.2 |
| $D_4$ | 4 | 470 | 92 | 7.6 | 0.1 | 0.1 | 0.2 | <0.1 |
| | 50 | 470 | 94.2 | 5.6 | 0.1 | 0 | 0.1 | <0.1 |
| | 200 | 470 | 96.7 | 3.3 | 0 | 0 | 0 | <0.1 |
| $D_5$ | 4 | 470 | 79.2 | 15.4 | 0.8 | 0.7 | 3.9 | 0.4 |
| | 50 | 470 | 82.3 | 13.8 | 0.6 | 0.5 | 2.8 | 0.3 |
| | 200 | 470 | 85.5 | 11.7 | 0.4 | 0.3 | 2.1 | 0.2 |
| $E_1$ | 4 | 470 | 91.1 | 8.4 | 0.2 | 0.1 | 0.2 | <0.1 |
| | 50 | 470 | 93.4 | 6.3 | 0.1 | 0.1 | 0.1 | <0.1 |
| | 200 | 470 | 96.2 | 3.8 | 0 | 0 | 0 | <0.1 |
| $E_2$ | 4 | 470 | 77.1 | 17.2 | 0.8 | 0.8 | 4.1 | 0.5 |
| | 50 | 470 | 79.8 | 15.7 | 0.7 | 0.6 | 3.2 | 0.4 |
| | 200 | 470 | 83.2 | 13.6 | 0.5 | 0.4 | 2.3 | 0.2 |
| $F_1$ | 4 | 470 | 93.8 | 5.9 | 0.1 | 0.1 | 0.1 | <0.1 |
| | 50 | 470 | 95.4 | 4.5 | 0.1 | 0 | 0 | <0.1 |
| | 200 | 470 | 97.2 | 2.8 | 0 | 0 | 0 | <0.1 |
| $F_2$ | 4 | 470 | 83 | 12 | 0.6 | 0.6 | 3.8 | 0.5 |
| | 50 | 470 | 85.2 | 11.1 | 0.5 | 0.5 | 2.7 | 0.4 |
| | 200 | 470 | 87.5 | 9.7 | 0.5 | 0.4 | 1.9 | 0.3 |

What we claim as this invention is:

1. A substantially neutral catalyst composition characterized by having (i) a neutralization heat as determined by ammonia absorption of less than about ten calories per gram at 320° C. and 300 mm. Hg; (ii) a specific surface of 50–75 m.²/gm.; and (iii) a pore volume of 0.4–0.8 cc./gm. with at least 75% of said pore volume corresponding to pores having an average diameter of 100–500 angstroms, said catalyst consisting essentially of: (a) an alumina carrier having a specific surface of 50–75 m.²/gm. and a pore volume of 0.4–0.8 cc./gm. with at least 75% of said pore volume corresponding to pores having an average diameter of 100–500 angstroms; (b) 0.01–1% by weight of a Group VIII metal selected from the group consisting of platinum, iridium, palladium and ruthenium; and (c) 0.01–1% by weight of a metal selected from the group consisting of tungsten and molybdenum.

2. A catalyst according to claim 1, wherein the Group VI metal is tungsten.

3. A catalyst according to claim 1, wherein the content by weight of Group VIII metal is from 0.1 to 0.5%.

4. A catalyst according to claim 1, wherein the content by weight of Group VI metal is from 0.1 to 0.5%.

5. A catalyst according to claim 3, wherein the content by weight of Group VI metal is from 0.1 to 0.5%.

6. A catalyst as defined by claim 1, wherein the alumina is of the gamma type.

7. A catalyst as defined by claim 5 wherein the alumina is of the gamma type.

References Cited

UNITED STATES PATENTS

| | | | |
|---|---|---|---|
| 3,574,730 | 4/1971 | Capp et al. | 252—465 |
| 3,377,269 | 4/1968 | Bloch | 252—465 |
| 3,422,002 | 1/1969 | Kovach et al. | 252—465 |
| 3,471,586 | 10/1969 | Lester | 252—465 |
| 3,472,897 | 10/1969 | Pryor et al. | 252—466 Pt |
| 3,655,747 | 4/1972 | Sennewald et al. | 252—470 |
| 3,661,769 | 5/1972 | Venuto et al. | 252—470 |
| 3,367,981 | 2/1968 | Napolitano | 252—463 |

OTHER REFERENCES

Bond: Catalysis by Metals; New York 1962 pp. 76–79.

L. DEWAYNE RUTLEDGE, Primary Examiner

W. R. SATTERFIELD, Assistant Examiner

U.S. Cl. X.R.

252—463, 465, 470